Inventor
HENRY A. BERLINER

By Scrivener & Parker
Attorneys

Sept. 26, 1950  H. A. BERLINER  2,523,938
REACTION PROPULSION SYSTEM FOR AIRCRAFT
Filed May 24, 1946  4 Sheets-Sheet 2

Inventor
HENRY A. BERLINER

By Scrivener & Parker
Attorneys

Inventor
HENRY A. BERLINER

By Scrivener & Parker
Attorneys

Patented Sept. 26, 1950

2,523,938

UNITED STATES PATENT OFFICE 2,523,938

REACTION PROPULSION SYSTEM FOR AIRCRAFT

Henry A. Berliner, Washington, D. C., assignor to Engineering and Research Corporation, Riverdale, Md., a corporation of Maryland Application May 24, 1946, Serial No. 672,142

1 Claim. (Cl. 244—15)

This invention relates in general to the reaction propulsion of aircraft and, more particularly, to reaction propulsion systems of the type in which the jets which produce the propelling reaction are discharged through ports located at or adjacent the trailing edges of the wings.

In known reaction propulsion systems of the general type to which the invention relates, passages are provided which have intake ports located in the fuselage or wings and exhaust ports at or adjacent the trailing edge of the wings. Within each of these passages is provided an air propelling means, such as a blower, and driving means for these blowers are also provided, being usually mounted in the fuselage. One disadvantage of such known systems is that failure of one of the air propelling means will substantially or entirely discontinue the jet produced thereby, leaving the other issuing from the opposite wing, and thus producing a propulsive force operating on only one side of the longitudinal axis of the aircraft. This creates a dangerous unbalance of forces acting on the aircraft and tending to turn it directionally.

The principal object of this invention has therefore been to provide an aircraft having a reaction propulsion system of the described type in which, upon failure of one of the air propelling means, the remaining propulsive force on the air craft will be balanced with respect to the longitudinal axis of the aircraft and will not tend to turn the aircraft directionally.

I have accomplished this object by this invention, by causing each of the two air propelling means to discharge separately through two wing passages which are on opposite sides of, and substantially equidistant from, the longitudinal axis of the aircraft and which do not communicate with the passages through which the other air propelling device or devices force the air. Thus, if one only of the air propelling means fails the other (or others) will continue to produce reaction jets located equidistantly from the longitudinal axis of the aircraft, whereby no turning force will be exerted on the aircraft. The air propelling devices may be two centrifugal fans driven by separate internal combustion engines, although in modified forms of the invention the fans may be driven by the same engine. Each driving engine may be so positioned that the air stream passes over it and cools it, while the exhaust gases delivered by each of the engines are discharged on the downstream sides of the fans or may be used to assist in driving the fans. On the downstream side of each fan each wing passage is so shaped that the discharged jet exerts a reactive force against one or more walls of the duct which extend laterally of the direction of flight and of the direction of the jet, whereby maximum reactive effect is produced. The discharge orifices themselves are of much greater length than height and are therefore of the type, with all of its advantages, which are disclosed in the copending application of Frank B. Lane, Serial No. 671,946, filed May 24, 1946, for Aircraft Propulsion.

Two embodiments of my invention are disclosed in the drawings, in which

Figure 1:
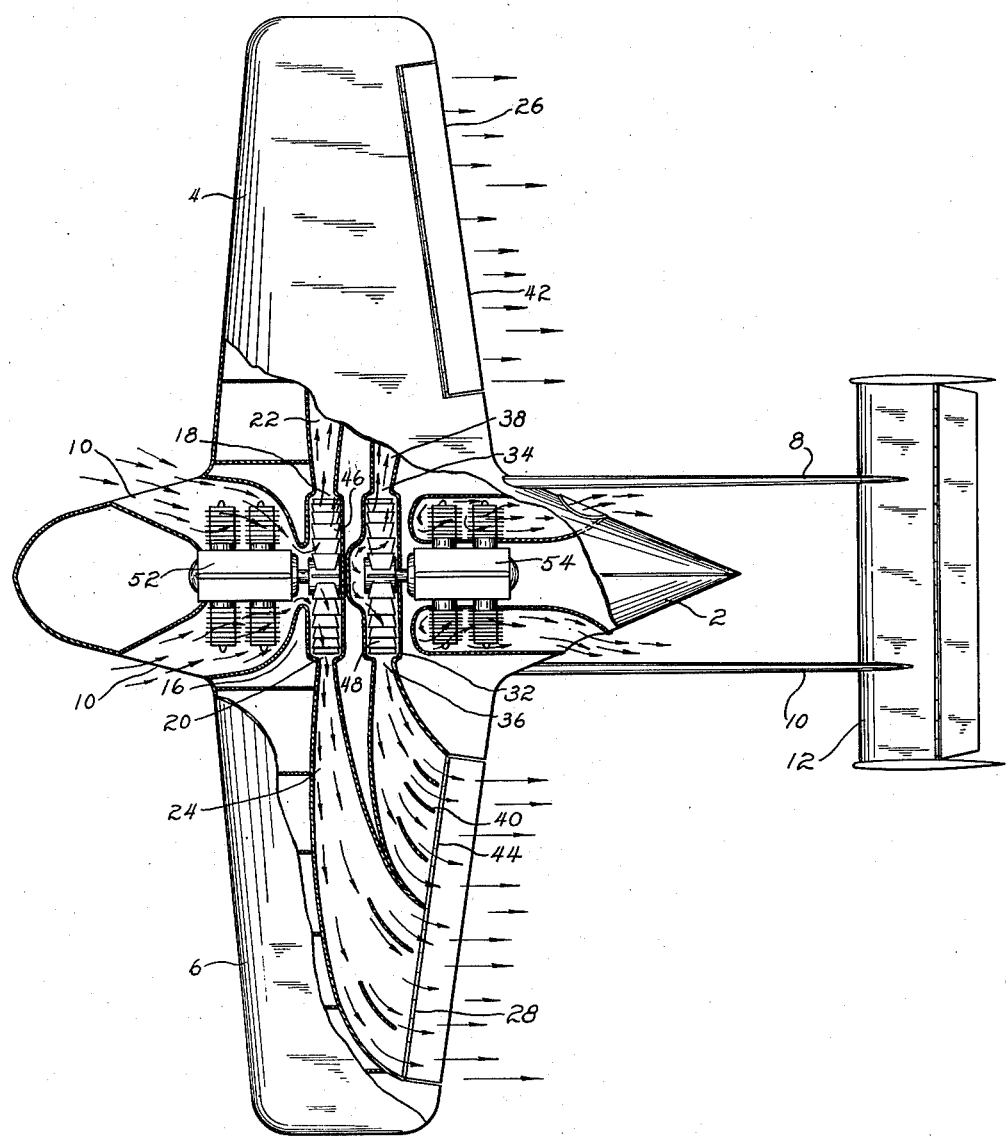
Fig. 1 is a top view, partly broken away, of an airplane including reaction propulsion means according to my invention.
Figure 2:
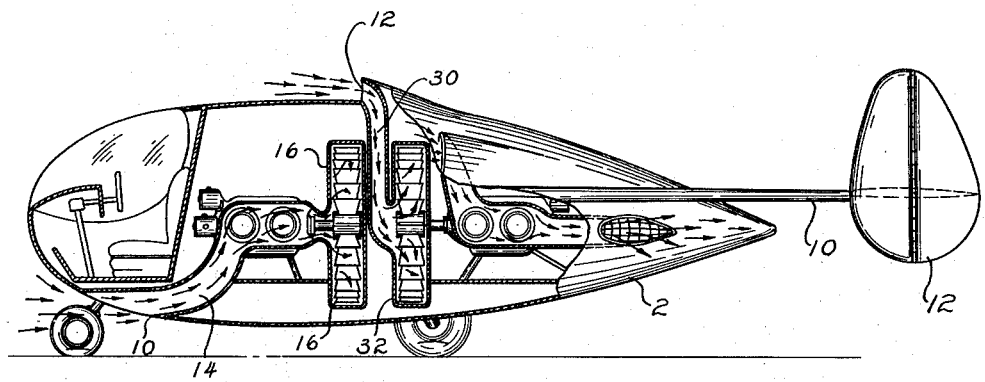
Fig. 2 is a side view, partly broken away, of the aircraft of Fig. 1.
Figure 3:
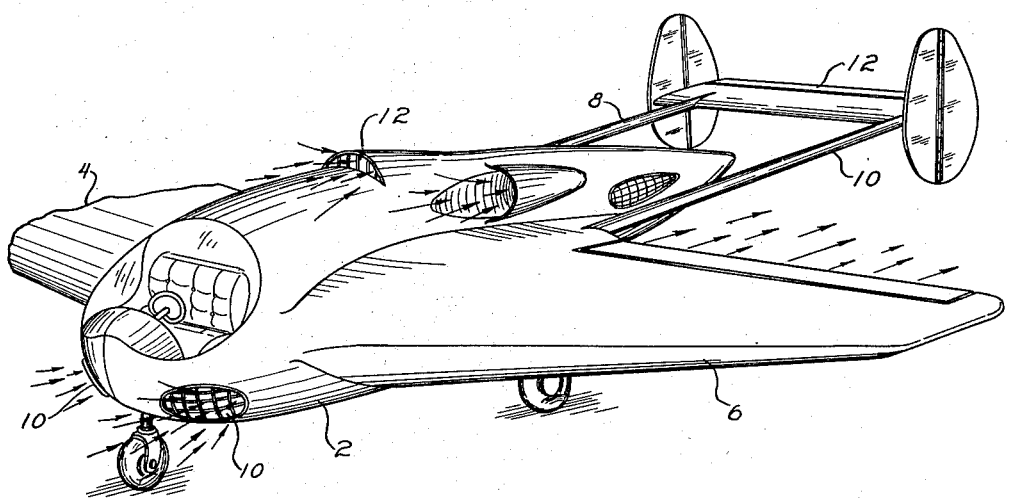
Fig. 3 is a perspective view, from the front, of the aircraft shown in Fig. 1, and Figs. 4, 5 and 6 are views, corresponding respectively to Figs. 1, 2 and 3, showing a second embodiment of the invention.

The aircraft illustrated in Figs. 1, 2 and 3 of the drawings and constituting the preferred embodiment of the invention, is of the so-called "unistructure" type disclosed in my United States Letters Patent No. 2,228,253, although any other type of aircraft might have been disclosed. This aircraft comprises the fuselage 2, wings 4, 6, twin tail booms 8, 10 and empennage 12. In the fuselage are formed two vertically-spaced inlet ports 10, 12 which are open to atmosphere to receive a continuous stream of the surrounding air. Lower inlet port 10 communicates through a conduit 14 with the center of a cylindrical chamber 16 within the fuselage. This chamber, in turn, communicates through openings 18, 20 formed in laterally opposed parts of its peripheral wall with passages 22, 24 which are formed respectively in the two wings and extend longitudinally thereof and toward the trailing edge and open to atmosphere through elongated, narrow discharge ports 26, 28 located in or near the trailing edges of the wings and which are spaced outwardly along the wing away from the fuselage. The upper inlet port 12 communicates through a conduit 30 with the center of a cylindrical chamber 32 within the fuselage which communicates through openings 34, 36 formed in laterally opposed parts of its peripheral wall with passages 38, 40 which are formed respectively in the two wings and extend longitudinally thereof and toward the trailing edges and open to atmosphere through elongated, narrow discharge ports 42, 44 located in or near the trailing edges of the wings and which are disposed, respectively, between the discharge ports 26, 28 and the fuselage. The leading edge of each wing passage is defined by a wall which, for a part of its length, extends in general parallelism to the discharge port of the passage, and therefore at approximately right angles to the direction of discharge through such port, thus providing a surface against which the reaction of the discharged airstream may be most effectively exerted. Curved vanes, or other suitable means such as cascaded airfoils, may be provided within each wing passage for guiding the airstream from an initial direction longitudinal of the wing to a direction at the discharge port substantially at right angles thereto. Control surfaces are hinged at their leading edges at or near the trailing edge of the associated wing, above and below each discharge port, and may be moved toward and away from each other to vary the velocity of the discharged jet, or above or below the contour of the wing in order to provide the usual aileron or flap operation. In the disclosed embodiment the two cylindrical chambers 16, 32 are axially aligned and in them are positioned the centrifugal blowers 46, 48 which are, respectively, mounted on the shafts of two internal combustion engines 52, 54.

Figure 4:
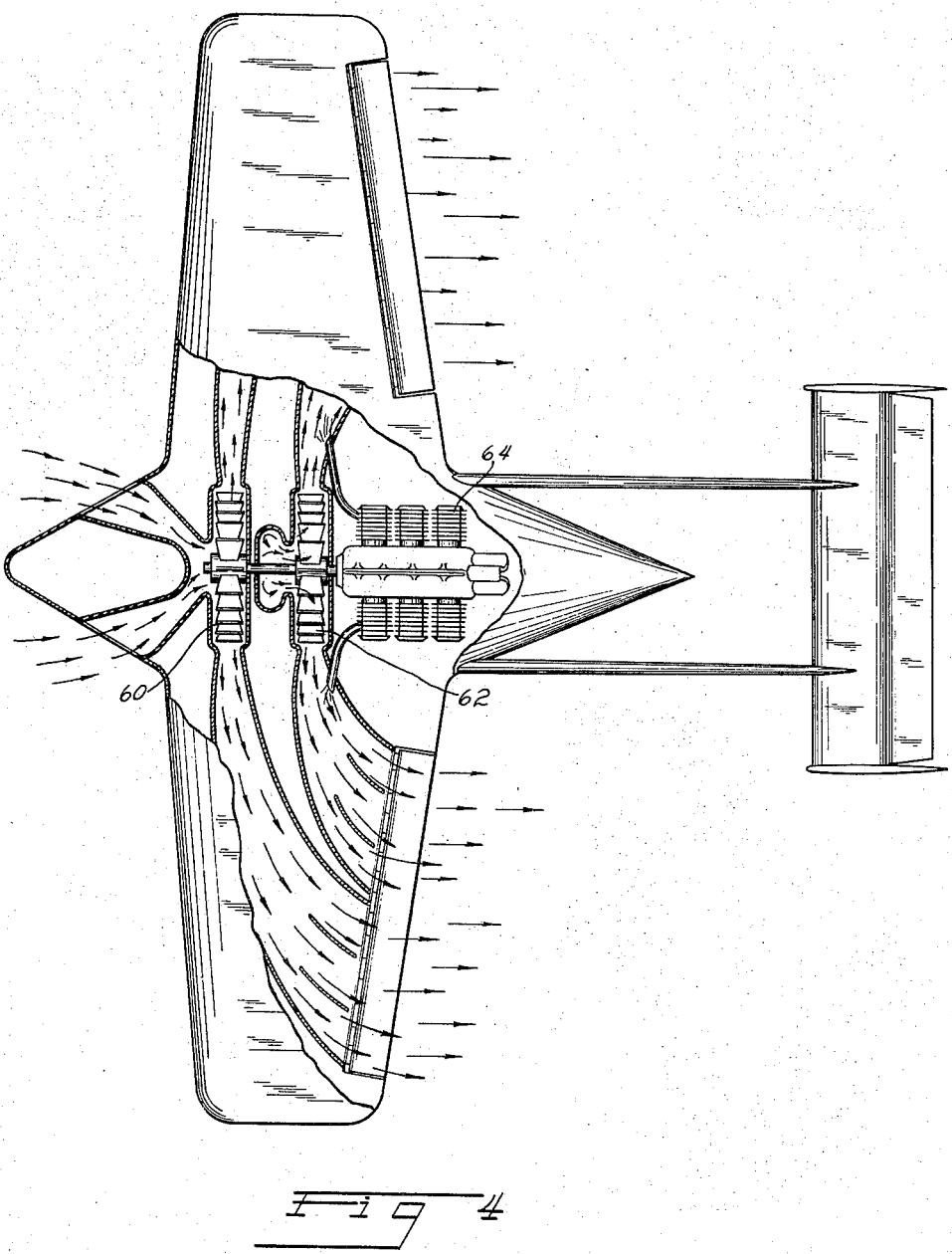
Figure 5:
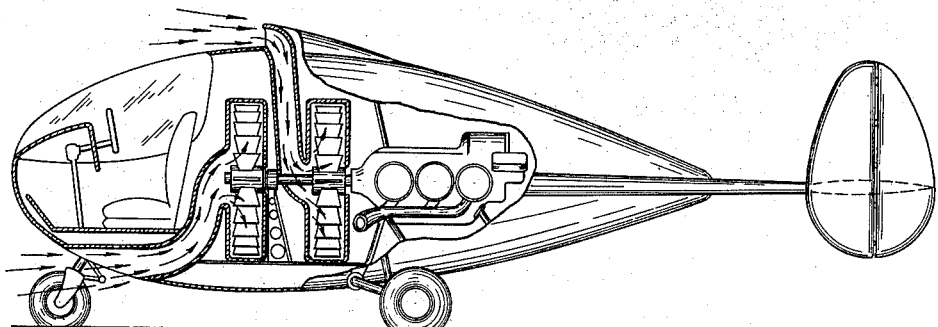
Figure 6:
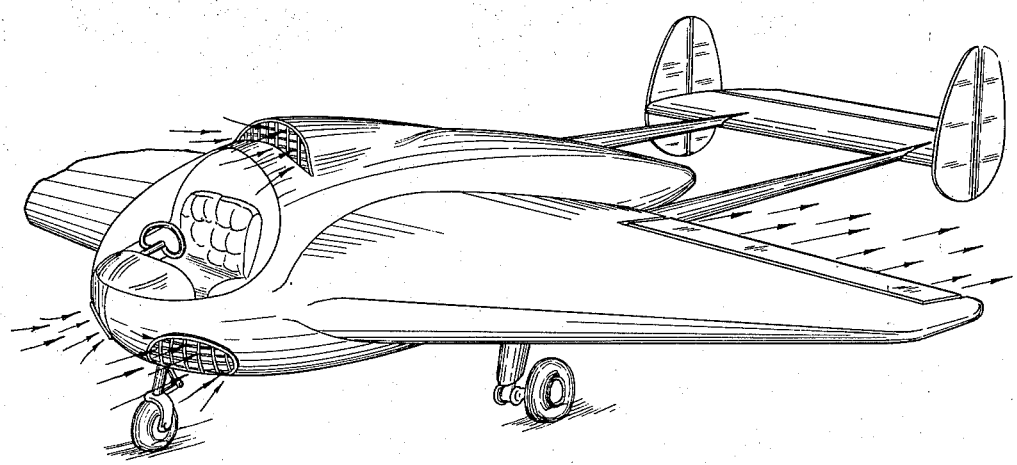

In the second embodiment of the invention, which is disclosed in Figs. 4, 5 and 6 the two air-propelling devices 60, 62 are mounted on the shaft of a single internal combustion engine 64, to be simultaneously driven thereby.

It will be obvious that in order to best achieve the objects of the invention the discharge ports of each pair (for example the ports 26, 28) should have approximately the same area when the control surfaces at each port are similarly arranged, whereby the velocities of the two jets issuing from these two ports, and therefore their reactive forces, will be substantially equal. Further, corresponding parts of the discharge ports of each pair should be substantially equidistant from the longitudinal axis of the aircraft in order that the jets issuing therefrom will exert balanced forces propelling the aircraft. It will also be apparent that the two (or more) pairs of wing passages may communicate with the same inlet port, if desired, instead of being separately supplied with air.

In operation, the described and illustrated propulsion system will operate to efficiently propel an aircraft at various speed ranges. The mechanical operation of the system will be apparent and will involve the operation of engines 52, 54 (or engine 64) to rotate the two fans to increase the velocity and energy of air passing into the inlet ports and through the wing passages by reason of the forward movement of the aircraft. The airstream moving into and through each wing passage is guided by the vanes or other means, which also serve to distribute the airstream over the entire wing passage whereby a jet which is substantially uniform over the entire area of each discharge port is produced. The lateral attitude of the ship may be varied, to produce level flight or banking, by movement of the control surfaces of the two wings in opposite directions above or below the wing contour. The control surfaces of each wing may also be operated toward or away from each other to vary the velocity of the jets discharged from the two orifices in accordance with changes in the forward speed of the aircraft and in order to provide the most efficient velocity of jet discharge. A directional control may also be exerted on the aircraft by opening or closing the control surfaces of one wing and moving those of the other wing oppositely, thereby differentially varying the velocities of the jets on the opposite sides of the longitudinal axis. In the event that either of the air propelling devices or systems of either of the disclosed embodiments of the invention should fail for any reason the other will continue to force air through two wing passages which are equidistant from the longitudinal axis of the aircraft, thus producing propulsive forces which are balanced with respect to such longitudinal axis.

While I have described and illustrated but two embodiments of my invention, it will be apparent to those skilled in the art that other embodiments, as well as modifications of these disclosed, may be made without departing from the spirit or scope of the invention, for the limits of which reference must be had to the appended claim.

What is claimed is:

A power plant for the reaction propulsion of aircraft of the type having wings extending laterally from a longitudinal axis, comprising two passages respectively extending longitudinally through the two wings and opening to atmosphere through similar discharge orifices located adjacent the trailing edges of the wings substantially equidistant from the longitudinal axis of the aircraft, two additional passages respectively extending longitudinally through the two wings and opening to the atmosphere through similar discharge orifices located at the trailing edges of the wings and disposed respectively outwardly along the wings from the discharge orifices of the first pair of passages substantially equidistant from the longitudinal axis of the aircraft, inlet port means in said aircraft disposed to receive a continuous stream of the surrounding air and communicating with said passages to supply the air thereto, means for increasing the velocity and energy of the airstream in said first pair of passages comprising a single, power driven blower, and means for separately increasing the velocity and energy of the airstream in said second pair of passages comprising a second single, power driven blower, the blowers being in axial alignment with the longitudinal axis of the aircraft.

HENRY A. BERLINER.

REFERENCES CITED

The following references are of record in the file of this patent:

UNITED STATES PATENTS

| Number | Name | Date |
|---|---|---|
| 1,772,196 | Wallace | Aug. 5, 1930 |
| 2,388,806 | Stalker | Nov. 13, 1945 |
| 2,395,513 | Stalker | Feb. 26, 1946 |

FOREIGN PATENTS

| Number | Country | Date |
|---|---|---|
| 461,626 | France | Nov. 3, 1913 |
| 870,648 | France | Dec. 22, 1941 |
| 886,889 | France | July 19, 1943 |